Patented Apr. 5, 1949

2,466,051

UNITED STATES PATENT OFFICE 2,466,051

PROCESS OF HYDROCARBON CONVERSION WITH A PRETREATED KAOLIN CLAY CATALYST

Hubert A. Shabaker, Media, and George Alexander Mills, Ridley Park, Pa., and Ruth C. Denison, Wilmington, Del., assignors to Houdry Process Corporation, Wilmington, Del., a corporation of Delaware No Drawing. Application January 30, 1946, Serial No. 644,426

12 Claims. (Cl. 196—52)

The present invention relates to the catalytic conversion of hydrocarbons such as fractions obtained or derived from petroleum or other carbonaceous or hydrocarbonaceous materials, and is particularly concerned with such conversion processes in which a cracking catalyst can be employed, as for instance in promoting scission of carbon to carbon linkages or in the typical reactions occurring in the reformation of liquid products in the boiling range of motor fuel.

It has heretofore been proposed to employ as contact masses in catalytic conversion of hydrocarbons certain natural earths and clays. Very few of such materials that have been tried in cracking, reforming or related reactions, have been found appropriate for the purpose, since in many instances catalysts formed therefrom were found to be substantially inert, or had a tendency to promote excessive deposition of coky substance which is not only undesirable on its own account, but such deposit also effects rapid decline in catalytic activity, necessitating frequent regeneration after comparatively short on stream operation.

The value of a contact material as a catalyst in the processes referred to is dependent upon its capability of selectively forming from the charge stock optimum quantities of desired liquid hydrocarbons, such as products useful as motor fuel, with a minimum production of gas and coke. For instance a contact material which is relatively inert catalytically, such as diatomaceous earth or kieselguhr, when attempted to be used in a cracking operation, yields products varying but little in quality and quantity from those obtained by thermal cracking in the absence of such contact material. On the other hand, there are contact materials of natural or synthetic origin which have the property of forming from petroleum hydrocarbon fractions large quantities of carbon and low molecular weight gases including hydrocarbon gases, at the expense of desired liquid fractions. Such contact materials likewise are nor ordinarily useful or desirable as cracking or reforming catalysts.

Although frequent suggestions are found in the literature that many types of naturally occurring clays and earths be employed as cracking catalysts, as a matter of fact only some of the sub-bentonite type clays belonging to the montmorillonite group and activated by previous acid treatment, have been found up to the present time of sufficiently high level of activity to merit consideration in commercial use. Kaolin clays when attempted to be used as catalysts in cracking of hydrocarbons have not demonstrated acceptable commerical results, since there were obtained only poor yields in quantity and quality of cracked products such as gasoline and/or comparatively excessive amounts of carbonaceous deposits were formed. Acid treatment of these kaolin clays, such as has been employed in activating the aforesaid bentonite clays, is ineffective in raising the catalytic activity to desired activity levels.

In accordance with the present invention, processes of hydrocarbon conversion including cracking and reforming operations as well as other conversion processes in which clay catalysts are utilized are carried out in the presence of modified and activated kaolin clays of improved properties as hereinafter described.

Naturally occurring clays are composed chiefly of hydrosilicates of aluminum but ordinarily contain besides the principal compounds and complexes of silica and alumina lesser proportions of compounds of iron, calcium, magnesium, etc. Some clays also include among their lesser components, compounds of zirconium or titanium. In the selection of natural absorptive materials for use as catalysts, it has previously been observed in U. S. Patent 2,078,945 of Eugene Houdry, that the content of iron compounds has a critical relation to the capacity of the contact mass for regeneration without extensive loss in catalytic activity. The patent indicates that contact masses suitable for use as catalysts sho<sup>...</sup> not contain over 3% of iron oxide.

Although a large part of the iron compou...us occurring in or as components of many clays are present in such form that they can be largely removed therefrom as for instance by conventional acid treatment, such procedures result, as in the prior art activatable bentonite type clays employed as catalysts, in products still containing in the order of about 1.5% or more of iron determined as ferric oxide. Acid treatment also removes portions of the aluminum content of the clay so that if the clay residue is to be used for purposes where aluminum content is an important consideration, as for catalyst manufacture, the extent of the treatment must accordingly be limited. Thus, on repeated or more drastic treatments, additional quantities of iron compounds may be removed but the products so obtained become increasingly impaired in physical properties and because of accompanying extraction of comparatively large quantities of aluminum compounds, the treatment provokes a marked decline in catalytic activity eventually resulting in products of such reduced catalytic activity that they are no longer useful for that purpose. Although it is not desired to be bound by any scientific explanation, there is reason to believe that the less readily removable iron components of iron-bearing clays are present in a different form from that of the more easily extractable iron components, being intimately associated in a complex with silicon or perhaps forming a part of the lattice structure by addition to or as proxy for other principal cations of the pattern. This form of iron component may be broadly designated as "isomorphous," although it is recognized that the clay structure may not necessarily be crystalline and that portions or all of the more tenaciously held iron components may vary in form from that of the principal component of the clay structure.

In our copending applications Serial Nos. 644,421; 644,422; 644,423, and 644,424, filed of even date herewith, there are disclosed special methods of treatment whereby the iron content of argillo-ferruginous materials can be materially reduced beyond the point obtained by conventional clay activation and other properties of the materials are changed. By the methods therein described, active cracking catalysts of unique properties are obtained by removing the major part of that portion of the iron which cannot be selectively extracted by acid treatment without accompanying removal of alumina and impairment otherwise of catalytic activity. By the described methods, kaolin clays are also brought to higher activity levels to warrant adoption for efficient practical use.

These structural changes, moreover, do not adversely effect the high density and comparatively high heat capacity characteristic of kaolin. The obtained catalysts demonstrate excellent gasoline/coke ratios and can be brought to surprisingly high activity level for clays of this type.

The clay catalysts useful in accordance with the present invention can be prepared by the methods described in the applications hereinbefore identified or by methods described below. By the described treatments for removing iron, kaolin clays previously regarded as inefficient or unsuitable as cracking catalysts are brought to acceptable activity levels and desirable performance characteristics, with new and important advantages distinguishing the same over commercial catalysts in current use derived from acid activatable bentonite clays, including generally an exceptionally high apparent density and high heat capacity providing notable advantages in conversion processes.

Among the advantages demonstrated by the catalysts employed in accordance with the present invention are unexpectedly low initial coke make on heavy and sulfur stocks, and a surprising resistance to "abnormal aging" and deterioration by highly corrosive charge stocks, on continued use. The weight ratios of gasoline/coke and gasoline/gas on lighter charge stocks may be substantially improved, and in fact, the present catalyst has in many instances demonstrated surprisingly better gasoline/gas ratios than commercial synthetic catalysts. The present catalysts are capable of withstanding more severe conditions and higher regeneration temperatures in practical operation which considered together with an indicated longer useful life of the catalyst and significantly improved yields of desired cracked products, constitute important economic advantages in addition to that afforded consequent to the use of readily available and inexpensive raw materials. Moreover, it is now made possible to operate more efficiently and economically with sulfur-containing and other corrosive stocks which rapidly deteriorate ordinary clay catalysts.

As the iron content of the clay is reduced as herein described the catalyst prepared therefrom is progressively improved in properties and the important advantages indicated above become emphasized by the structural modifications which are thought to take place coincidentally with or as a result of the freeing of the isomorphous iron. The various steps of the process, however, should be controlled to minimize accompanying removal of alumina. Although the tendency to increased catalytic activity becomes noticeable with progressive removal of iron compounds particularly when isomorphous iron is attacked, it has been observed generally that with kaolin clays having an original iron content corresponding to over 1.2% $Fe_2O_3$, catalysts of acceptable activity level and desirable performance characteristics approaching commercial clay catalysts of the acid-activated montmorillonite type, are obtained when the described treatments effect a removal of iron to about 0.8% $Fe_2O_3$. The preferred catalysts of superior properties are obtained when the iron content is lower than 0.4% $Fe_2O_3$, while for greater stability to sulfur as when the catalyst is to be employed in treating highly corrosive stocks, best results are obtained with catalysts of less than 0.2% $Fe_2O_3$.

The improved catalysts of exceptionally low iron content having the advantageous properties and characteristics set forth above can be obtained by treating the clay to convert the iron components present to acid soluble form, for example soluble salts, including that portion of the iron which is present in a form not efficiently and selectively removable by acid leaching, whereby the iron is made available for subsequent removal such as by a mild acid treatment and/or washing or in some instances by volatilization. In accordance with a preferred embodiment, the clay or earth is subjected in substantially dry form to treatment with a chemically reactive gas or vapor at elevated temperature. The selected reagent is one furnishing a reactant capable of forming a salt with the iron released thereby. In terms of the theory above set forth, although it is not desired to be bound thereby, there is reason to believe that the iron present as a silicon complex or otherwise forming a part of the lattice structure as by addition to or proxy for other principal cations of the pattern, is converted by the high temperature gas or vapor treatment to simpler or more reactive compounds such as salts which are soluble in and/or react with the acid that may be employed in subsequent leaching. Observation of the properties and characteristics of the novel catalysts leads consistently to the view that by the selective removal of iron compounds, as described, new molecular channels may be formed in the clay evenly distributed throughout its mass, effecting consequent increased and uniform adsorptivity.

The treatment with the gas or vapor at elevated temperature may be preceded and is preferably followed by a wet treatment with mineral acid or an organic acid which forms soluble iron salts or complexes, including lower aliphatic carboxylic acids such as oxalic and acetic as well as hydroxy acids including lactic and the so-called sugar acids. Where the acid treatment precedes, the more available iron compounds (e. g., outside of the lattice structure) are converted to soluble iron salts which are removed and the residual iron component (e. g., chemically combined in the lattice) thereafter can be acted upon with greater facility by gaseous treating agents. Acid treatment following the dry gaseous treatment is effective in removing or assisting in the removal of products formed by the reaction of the gaseous agents with the complex or otherwise less available residual iron components. It will be readily understood, therefore, that it may be desirable to employ an acid treatment both before and after the gas or vapor treatment at elevated temperature.

Although with some kaolins the acid pre-treatment may be beneficial, in most instances it was found that such pre-treatment was not necessary. The acid treatment when practiced may be effected by known processes such as are employed in the art for "acid activation" in the manufacture of decolorizing clays, but milder treatments are preferred in the treatment of kaolinite clays. For instance, the acid treatment may be carried out on the clay in finely divided form while the clay is suspended in water as in the nature of a slurry, to which concentrated mineral acid such as hydrochloric or sulfuric is added, or dilute mineral acid may be added directly to the finely divided clay. In either case the ratio of acid to clay need not be as high as usual in "activation" processes which is generally in the order of 30–40%. The mixture of clay and acid is preferably heated to about 160° to 210° F. for a period of two to twelve hours, thereafter washed with water and filtered. If desired, the clay may at this point be washed free of acid ions with accompanying extraction of soluble metal salts. The acid treated clay with or without purification by washing may then be dried by any known or desired manner. Although more concentrated or larger proportions of acid may be employed as well as higher temperatures including increased pressures, or longer periods of treatment, no advantage has been observed for the more severe conditions for acid pretreatment of kaolin clays, which as above indicated, do not require the degree of acid treatment generally employed for activation of bentonite clays. When found beneficial in opening the pores in the kaolin clay for access by the gas or vapor treating agent only a mild acid treatment will be required for that purpose.

The untreated kaolin clay or the above described acid treated clay in dry finely divided form, or after being formed into aggregate masses as for instance by granulating, molding, extruding or the like (as is practiced in forming of clay catalysts) is then subjected to high temperature gas or vapor treatment at a temperature preferably in the range of from about 1200° F. to 1600° or 1650° F. or somewhat higher provided that the higher temperatures do not effect rapid shrinkage or substantial incipient fusion of the clay impairing porosity. Substantial improvement in the clay may be obtained at lower temperatures, as at 1000° F., but may require repeated or prolonged treatment to reduce the iron content to the desired extent and effect the desired modification. The quantity of gas or vapor employed should be at least sufficient to chemically combine with the quantity of iron present in the clay but is advantageously employed in excess.

As above indicated, the vapor or gas employed is one which reacts chemically with the iron components initially present in the clay or remaining therein after the preliminary acid treatment, if practiced, including that portion of the iron intimately associated in the lattice structure or otherwise in so-called "isomorphous" form. The reagents employed, moreover, act selectively on the iron content without affecting substantial quantities of the aluminum or silicon components of the product, as to an extent which would impair the activity of the clay product as a catalyst. Where the gaseous treating agent converts the iron components of the clay to compounds vaporizable at the treating temperature no further treatment to remove the iron would be required. This would be the case for instance in a treatment with chlorine gas at 1200° to 1600° F. wherein the iron would be vaporized in the form of ferric chloride. In other instances, however, such as where the chlorine treatment is at lower temperatures or the reactive gas or vapor does not form volatile compounds, the iron compounds are nevertheless converted by the treatment to a more available and more readily removable form, such as iron salts, which can then be removed from the treated clay by washing with water or a solvent for the iron salts, or by treatment with a dilute acid, with or without alternate water washing. For example, the clay may be treated with $H_2S$ at 1400° F. and then washed with dilute hydrochloric acid. Instead of leaching out the converted iron compounds, formed by the gas or vapor treatment, they might alternatively be removed by further treatment with another gas or vapor such as chlorine to volatilize the same. Even in instances where subsequent acid leaching is not required to remove iron, it has been found nevertheless advantageous to treat the clay with acid subsequent to the gas or vapor treatment, since more active catalysts are usually obtained in this manner.

The invention includes in addition to the preferred types of gaseous treating agents already named, other gases or vapors capable of converting iron components of the clay to simpler or more available form, such as phosgene, carbon disulfide, sulfurmonochloride, sulfonyl chloride, and sulfur vapors. As will be readily understood the more active gases or vapors will require lower temperatures than less reactive reagents for comparable severity of treatment. For example a treatment with $CS_2$ may require temperatures in the order of 1300° to 1400° F. to obtain effects comparable with $H_2S$ at 1200° F.

When the clay to be treated contains components or impurities reactive to form gases or vapors of the type described, the treating reagent may be accordingly selected to react with the said component or impurities, initially to form such gases or vapors in situ. For instance, if the clay contains sulfate ions or compounds, as it would if left in unwashed state after sulfuric acid treatment, the product may be then treated with hydrogen gas at the stated temperatures, forming hydrogen sulfide by the reaction with the sulfate, and in that manner accomplishing the effect of an $H_2S$ treatment. Of course, if the residual $SO_4$ is insufficient to supply the required quantity of $H_2S$, additional sulfate may be added to the clay as by further treatment with sulfuric acid or a suitable sulfate.

As heretofore indicated the improved catalysts of the present invention cannot be obtained by continued or extensive acid treatment of the clay to reduce the iron content, since attempts to extract iron from the clay beyond a limiting maximum removability (evidently, at least in many cases, the point at which the readily available iron is depleted and only isomorphous iron remains), results in the accompanying removal of excessive quantities of aluminum compounds with reduction in catalytic activity. For instance a raw kaolinite clay having an $Al_2O_3/Fe_2O_3$ weight ratio of about 44 was drastically treated with acid until the iron content was reduced to 0.27% $Fe_2O_3$, the product then contained only 2.3% $Al_2O_3$ and was practically inert as a catalyst. On the other hand, the present process provides for the selective removal of iron compounds without corresponding excessive removal of active components such as alumina as will be seen from the following experiments:

(a) A kaolin clay having an original content of $Al_2O_3$ of 33% and an iron content corresponding to 1.4% $Fe_2O_3$ was treated at 1400° F. with $H_2S$ gas for 2 hours followed by an additional treatment with $Cl_2$ gas at 1400° F. for two hours, and washing at room temperature with 15% HCl. The treated product on analysis showed that the $Fe_2O_3$ content was only ¼ of that of the original product (0.35% $Fe_2O_3$) whereas the alumina content was only slightly reduced 30.22% $Al_2O_3$).

(b) Another raw kaolin sample having an original content of 45.5% $Al_2O_3$ and 1.15% $Fe_2O_3$ after treatment with $Cl_2$ gas at 1400° F. for two hours showed on analysis .44% $Fe_2O_3$ and 45.8% of $Al_2O_3$.

Although in certain known processes of hydrocarbon conversion the catalyst can be employed in the form of finely divided particles or powders suspended in the charge stock, in other procedures, as for instance, in fixed or moving bed operation, the catalyst is preferably employed in the form of larger aggregates or agglomerated masses such as pellets, tablets, coarse granules, or the like. In the latter case, the larger aggregates may be formed at any stage in the production of the final catalyst, but preferably immediately subsequent to the preliminary acid treatment, if practiced. These larger masses may be formed for instance by compressing the dry finely divided particles or powders in a pelleting machine or by previously wetting the dry, treated or untreated clay with water or other inert liquid that will bind the small particles or powder into a cake which, after drying, can be broken up into granules or fragments of desired sizes, or the wet mix can be formed into more regular shapes by molding including casting, extruding or the like. In instances where the described high temperature gas or vapor treatment is carried out on powder or fine particles, the cohesive properties of the clay may be affected, in which case it may be necessary to add a suitable binder or lubricant to assist in the forming operation, care being taken in selecting such ingredient and maintaining the addition at a minimum so as not to interfere with the catalytic activity of the formed mass, as for instance one can use a raw or acid activated clay of good cohesive properties as a binder for the treated kaolin clay. It is preferred, however, to carry out the described gas or vapor treatment of the clay while in the form of granules, tablets, pellets or other agglomerate masses particularly if the final catalyst is to take the form of such larger aggregate. If the catalyst is to be employed in the hydrocarbon treating process in the form of fine particles or powders, formation of larger aggregates for treatment is not necessary, but, if desired, larger masses can be formed and treated in accordance with the above-described procedure and subsequently ground or comminuted to the required fineness.

Although the clay catalyst prepared by the preferred procedure has already been subjected to a high temperature treatment, it is still preferred as a final step in the preparation of the catalyst, for use in hydrocarbon conversion process, to subject the same to calcination at temperature above 800° C. in air with or without added steam or in steam alone.

The present invention is not limited to the use of catalysts prepared from clays of the type which could not hitherto be successfully employed as catalysts in cracking or reforming of hydrocarbons, but includes active catalysts prepared from kaolin clays in general. For instance, a kaolin clay obtained from a deposit located on the Eccles estate in the vicinity, Putnam County, Florida, has recently been found to possess interesting catalytic activity without acid treatment or any other preparation. Clay of this type can be brought to considerably higher activity levels with desired selectivity properties by the methods described. Although it has been suggested in the literature that the adsorptive capacity and activity of clay depend upon crystalline structure, this assertion is not supported in our experiments, since we have found among the calcined kaolin clays, as well as other clays, products showing an amorphous pattern on X-ray diffraction, yet having an acceptable catalytic activity level.

In the use of the catalysts according to the present invention no change in conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 3, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

Catalysts with which the invention is concerned also find use in synthesis reactions, for example, polymerization of gaseous hydrocarbons to liquid products.

As a general rule the active catalysts prepared from kaolin clays show desirable product distribution from the standpoint of lower molecular weight liquid hydrocarbons ($C_5$ and lighter) present in the gasoline fraction with substantial elimination of components of low gas gravity and while the octane rating of obtained gasoline is generally equivalent to that obtained by the use of conventional synthetic silica-alumina catalyst, the olefin content of the gasoline is usually somewhat higher in the case of the kaolin product. Because of the high density and accompanying high heat capacity of catalysts prepared from kaolin clay, as well as the higher heat stability, the throughput of charge can be stepped up, without introduction of damaging regeneration temperatures to obtain required coke burnoff in cycle, since the recited physical properties of the kaolin catalyst also lead to approximately even regeneration temperatures throughout the mass without pronounced localized zone-burning.

The term "kaolin" as herein employed has reference to raw clays or modified clays derived therefrom which clays in raw state contain kaolinite, dickite, nacrite, halloysite, or anauxite, as the principal clay mineral constituent present therein.

In the following examples notations of catalytic activity are expressed in terms of the standard test (CAT-A method) described in "Laboratory method for determining the activity of cracking catalysts" by J. Alexander and H. G. Shimp, page R537, National Petroleum News, Technical Section, August 2, 1944. In accordance with the method, a light gas oil is contacted with the catalyst under fixed cracking conditions and the activity of the catalyst is designated in terms of volume per cent of obtained gasoline; the weight per cent of wet gas, specific gravity of the gas, and weight per cent of carbonaceous deposit are also determined.

Example I

The raw clay treated in this example was a kaolinite clay from Putnam County, Florida, known as "Edgar EPK" which gave the following analysis on a dry (105° C.), sandfree basis:

| | Percent |
|---|---|
| Ignition loss | 12.9 |
| $SiO_2$ | ¹46.6 |
| $Al_2O_3$ | ¹38.8 |
| $Fe_2O_3$ | 1.0 |
| CaO | 0.44 |
| MgO | 0.23 |
| $TiO_2$ | 0.35 |
| Alk. metal (as oxide) | 0.52 |

¹ $SiO_2/Al_2O_3 = 1.2$.

The above clay was subjected in raw state to treatment with $H_2S$ in excess at 1500° F. for two hours. The clay became intensely black. After cooling, it was leached with an equal volume of 15% HCl over a period of 72 hours, the acid being changed 4 times. After decanting, washing and drying, the clay was calcined at 1050° F. for two hours in air. The analyzed iron content was .07% $Fe_2O_3$. The activity of the obtained catalyst is compared in the following table with the original raw clay and the same clay which received only an acid-treatment with 10% $H_2SO_4$ (.40 ratio to dry clay) for eight hours and calcined under the same conditions as the compared products.

| Edgar clay | Gasoline | Coke | Gas | Gas Grav. |
|---|---|---|---|---|
| Raw | 14.5 | 2.7 | 4.0 | 0.57 |
| Acid treated | 27.8 | 1.8 | 4.4 | 1.36 |
| $H_2S$ treated and acid leached | 40.8 | 3.1 | 10.2 | 1.46 |

Example II

A sample of kaolin clay from Eccles property, Putnam County, Florida, was treated with an excess of chlorine gas for two hours at 1500° F. A large part of the iron was volatilized as ferric chloride. On analysis the original iron content of 1.4% $Fe_2O_3$ was found to have been reduced to .31%. The gasoline/gas and gasoline/coke ratio were decidedly improved, the coke production being substantially half of that obtained with clay from the same source calcined in air at the above temperature.

The same clay was brought to about 0.4 $Fe_2O_3$ by chlorine treatment at 1400° F. followed by acid leaching at room temperature. Tested on cracking of a light gas oil under standard conditions, there was obtained a yield of 34.7% by volume gasoline, whereas the original clay calcined in air showed a maximum activity of the order of 25–26% gasoline.

The original Eccles clay had the following analysis by weight (containing 10–20% sand): 65.8% $SiO_2$, 32.4% $Al_2O_3$, 1.4% $Fe_2O_3$, 0.23% CaO, 0.21% MgO, 0.6% $TiO_2$.

Example III

Eccles clay, in pellet form, after calcination for two hours in bone dry air at 1500° F. was treated with $H_2S$ at 1400° F. for two hours, the treating apparatus and contents having been previously freed from air by sweeping with nitrogen. The pellets turned black. Treated with an equal volume of 15% HCl the color progressively faded with evolution of $H_2S$. The product was then drained of acid, washed several times with water, dried in the oven at moderate temperature, and finally calcined at 1400° F. for ten hours in the presence of 5% steam. On analysis, the content of iron compounds was found to be 0.23% $Fe_2O_3$.

The identical original clay treated with $H_2S$ at 1000° F. for two hours but otherwise prepared as in the previous paragraph, showed on analysis .81% $Fe_2O_3$.

The following tabulation compares the performance characteristics of the treated and untreated clay:

| | Gasoline | Coke | Gas |
|---|---|---|---|
| Raw Eccles clay 1500° F. (air) | 25.5 | 2.0 | 4.1 |
| Eccles acid treated clay 1500° F. (air) | 32.9 | 2.6 | 6.1 |
| Eccles clay $H_2S$ 1000° F. (Example III) | 31.3 | 1.7 | 4.7 |
| Eccles clay $H_2S$ 1400° F. (Example III) | 34.5 | 1.9 | 5.6 |

Example IV

A raw kaolin clay from Huron, Indiana, having an iron content corresponding to 0.95% $Fe_2O_3$ was treated with $H_2S$ at 1400° F. for 2 hours followed by leaching with 15% HCl for 3 days. After washing and drying the product was calcined in air at 1050° F. for two hours. The extent of improvement in cracking activity is indicated by the following comparison with the original raw clay which received the same calcination in air.

| Catalyst | Activity | | | |
|---|---|---|---|---|
| | Gasoline Vol. percent | Coke Wt. percent | Gas Wt. percent | Gas Grav. |
| From Original Clay ($Fe_2O_3$ =0.95) | 13.2 | 7.4 | 6.8 | 0.46 |
| Example IV ($Fe_2O_3$=0.11) | 39.5 | 3.4 | 10.3 | 1.50 |

Obviously many modifications and variations of the invention as hereinbefore set forth may be made without departing from the spirit and scope thereof and therefore only such limitations should be imposed as are indicated in the appended claims.

We claim as our invention:

1. The method of converting hydrocarbon oil to gasoline hydrocarbons of improved value as motor fuel which comprises subjecting the hydrocarbon oil under catalytic cracking conditions to contact with a clay catalyst prepared by subjecting kaolin to treatment at a temperature of at least 1200° F. with a chemically reactant gas capable of forming salts with iron and to an extent sufficient to convert the major portion of the iron present in the kaolin to iron salts, followed by removal of said iron salts to the extent that the total content of iron compounds in the catalyst formed therefrom corresponds to less than .4% $Fe_2O_3$.

2. The method of producing gasoline from hydrocarbon oils heavier than gasoline which comprises subjecting the heavier oils under catalytic cracking conditions to contact with a clay catalyst prepared by subjecting kaolin to treatment at a temperature in the range of 1400–1600° F. with a chemically reactant gas capable of forming salts with iron and to an extent sufficient to convert the major portion of the iron present in the kaolin to iron salts, followed by removal of said iron salts to the extent that the total content of iron compounds in the catalyst formed therefrom corresponds to less than .4% $Fe_2O_3$.

3. The method of cracking highly corrosive petroleum oil heavier than gasoline which comprises subjecting the corrosive oil under catalytic cracking conditions to contact with a clay catalyst prepared by subjecting kaolin to treatment at a temperature at least 1200° F. with a chemically reactant gas capable of forming salts with iron and to an extent sufficient to convert the major portion of the iron present in the kaolin to iron salts, followed by removal of said iron salts to the extent that the total content of iron compounds in the catalyst formed therefrom corresponds to less than .2% $Fe_2O_3$.

4. In methods of catalytically converting hydrocarbons at elevated temperature employing clay catalysts, the improvement wherein the catalyst employed is a kaolin clay prepared by acid leaching of a modified kaolin containing iron sulfide.

5. In methods of catalytically converting hydrocarbons at elevated temperature employing clay catalysts, the improvement wherein the catalyst employed is a kaolin clay which has been treated with hydrogen sulfide at elevated temperatures adapted to convert iron present therein to iron sulfide, followed by treatment of the sulfided clay with acid under mild conditions.

6. The method of converting hydrocarbon oil to gasoline hydrocarbons of improved value as motor fuel which comprises subjecting the hydrocarbon oil under catalytic cracking conditions to contact with a modified kaolin clay catalyst containing a total of iron compounds corresponding to less than 0.4% $Fe_2O_3$, said modified kaolin clay catalyst being prepared by a process comprising subjecting a kaolin clay in dry condition to the action of hydrogen sulfide at a temperature of at least 1200° F., and acid leaching the resulting sulfided clay under mild conditions.

7. A method in accordance with claim 6 in which the silica-alumina ratio of said modified kaolin clay catalyst is substantially the same as the silica-alumina ratio of said kaolin clay subjected to the action of hydrogen sulfide.

8. In methods of catalytically converting hydrocarbons at elevated temperature employing clay catalysts, the improvement comprising contacting the hydrocarbons at said elevated temperature with a catalyst which is a kaolin clay which has been treated with a sulfiding gas at 1400° F. adapted to convert iron present therein to iron sulfide, followed by treatment of the sulfided clay with acid under mild conditions effective to remove said iron sulfide.

9. A method in accordance with claim 8 in which the total iron content of the catalyst does not exceed that corresponding to 0.4% $Fe_2O_3$.

10. The method of converting hydrocarbon oil to gasoline hydrocarbons of improved value as motor fuel which comprises subjecting the hydrocarbon oil under catalytic cracking conditions to contact with a modified kaolin clay catalyst containing a total of iron compounds corresponding to less than 0.4% $Fe_2O_3$, said modified kaolin clay catalyst being prepared by a process comprising subjecting a kaolin clay in dry condition to the action of a sulfiding gas at a temperature of at least 1200° F. to convert iron in said clay to iron sulfide, and leaching the resulting sulfided clay with dilute mineral acid at substantially room temperature.

11. A method in accordance with claim 10 in which the sulfiding gas is carbon disulfide.

12. A method in accordance with claim 10 in which the sulfiding gas is hydrogen sulfide.

HUBERT A. SHABAKER.
GEORGE ALEXANDER MILLS.
RUTH C. DENISON.

REFERENCES CITED

The following references are of record in the file of this patent:

UNITED STATES PATENTS

| Number | Name | Date |
|---|---|---|
| 1,727,441 | Parentani | Sept. 10, 1929 |
| 2,129,693 | Houdry | Sept. 13, 1938 |
| 2,174,610 | Weir | Oct. 3, 1939 |
| 2,300,878 | Drennan et al. | Nov. 3, 1942 |
| 2,305,220 | Legg | Dec. 15, 1942 |
| 2,322,674 | Thomas | June 22, 1943 |
| 2,369,001 | Ahlberg et al. | Feb. 6, 1945 |
| 2,374,313 | Veltman | Apr. 24, 1945 |
| 2,388,302 | Weyl | Nov. 6, 1945 |
| 2,410,436 | Ewing | Nov. 5, 1946 |